US007308378B2

(12) United States Patent
Starzyk et al.

(10) Patent No.: US 7,308,378 B2
(45) Date of Patent: Dec. 11, 2007

(54) SYSTEM AND METHOD FOR IDENTIFYING AN OBJECT

(75) Inventors: Janusz A. Starzyk, Athens, OH (US); Dale E. Nelson, Fairborn, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 11/361,595

(22) Filed: Feb. 24, 2006

(65) Prior Publication Data

US 2006/0142956 A1 Jun. 29, 2006

Related U.S. Application Data

(62) Division of application No. 10/362,004, filed as application No. PCT/US01/22852 on Jul. 20, 2001, now Pat. No. 7,035,754.

(60) Provisional application No. 60/220,768, filed on Jul. 21, 2000.

(51) Int. Cl.
*G06F 19/00* (2006.01)
*G06F 11/30* (2006.01)

(52) U.S. Cl. ............ 702/120; 702/182; 702/189; 706/45

(58) Field of Classification Search .......... 702/74, 702/120, 185, 189, 109, 188, 182; 706/45, 706/47, 60; 705/45
See application file for complete search history.

(56) References Cited

U.S. PATENT DOCUMENTS 5,701,400 A * 12/1997 Amado .................. 706/45
5,970,171 A * 10/1999 Baraghimian et al. ...... 382/187
6,014,652 A * 1/2000 Hill et al. ................... 706/16
6,393,413 B1 * 5/2002 Jorgensen et al. .......... 706/20

OTHER PUBLICATIONS

J.A. Starzyk, Doug Liu, Zhi-Hong Liu, D. Nelson, and J. Rutkowski, "Entropy-Based Optimum Test Points Selection For Analog Fault Dictionary Techniques," IEEE Transactions on Instrumentation and Measurement, vol. 53, No. 3, Jun. 2004, pp. 754-761.

D.E. Nelson, J.A. Starzyk, and D. D. Ensley, "Iterated Wavelet Transformation and Signal Discrimination for HRR Radar Target Recognition," IEEE Trans. on Systems, Man and Cybernetics, Part A, vol. 33, No. 1, Jan. 2003, pp. 52-57.

D.E. Nelson, J.A. Starzyk, and D. D. Ensley, "Interactive Wavelet Transformation and Signal Discrimination for HRR Radar Target Recognition," Multidimensional Systems and Signal Processing, vol. 14, No. 2. 2002, 23 pages.

(Continued)

*Primary Examiner*—Bryan Bui
(74) *Attorney, Agent, or Firm*—Calfee, Halter & Griswold LLP

(57) ABSTRACT

A system and method for determining the classification of a signal, or the identification of an object is provided. Based on rough set theory, or data mining, a training data set is partitioned and labeled with a multi-class entropy method. Reducts are calculated from a subset of the best-performing columns of the partitioned and labeled training set data. These reducts are applied to test signals and combined for each signal classification. The present system and method produces a more accurate, robust and efficient classification result.

25 Claims, 10 Drawing Sheets

OTHER PUBLICATIONS

J.A. Starzyk, D. E. Nelson, and K. Sturtz, "A Mathematical Foundation for Improved Reduct Generation in Information Systems," Journal of Knowledge and Information Systems, vol. 2, n. 2, Mar. 2000 pp. 131-146.

J.A. Starzyk, D.E. Nelson, and K. Sturtz, "Reduct Generation in Information Systems," Bulletin of International Rough Set Society, 1999, 3 (½), 4 pages.

D. E. Nelson and J.A. Starzyk, "High Range Resolution Radar Signal Classification: A Partitioned Rough Set Approach," Proc. Southeastern Symposium on System Theory, (OH 2001), 4 pages.

D. E. Nelson and J. A. Starzyk, "High Range Resolution Radar—Extensions to Rough Set Theory For Automatic Target Recognition," SPIE 15th Annual Int. Symp. on Aerospace/Defense Sensing Simulation and Controls, (Orlando, FL, Apr. 2001), 5 pages.

D. E. Nelson and J. A. Starzyk, "Fusing Marginal Reducts for HRR Target Identification" 4th World Multiconference on Systems, Cybernetics and Informatics (SCI2000), (Orlando, FL, Jul. 2000), pp., 5 pages.

J. A. Starzk, D. E. Nelson, and K. Sturtz, "Reduct Generation in Information Systems," The Sixth Int. Workshop on Rough Sets, Data Mining and Granular Computing, at JCIS'98 (Research Triangle Park, NC), Oct. 1998, 4 pages.

D. E. Nelson and J.A. Starzyk, "Advanced Feature Selection Methodology for Automatic Target Recoginition," Proc Southeastern Symposium on System Theory, (Coolville, TN 1997), 5 pages.

J. A. Starzyk and D. Nelson, "Independent Classifiers in Ontogenic Neural Networks For ATR," Adaptive Distributed Parallel Computing Symposium (Fairborn, OH 1996), 8 pages.

Publications—Articles in Professional Journals, www.ent.ohiou.edu/~staryk/network/research/papers.htm, printed Apr. 13, 2005, 12 pages.

D.E. Nelson's Dissertation entitled "High Range Resolution Radar Target Classification: A Rough Set Approach," Jun. 2001, 165 pages.

* cited by examiner

| Signal | Target ID | Range Bin 1 | Range Bin 2 | Range Bin 3 | Range Bin 4 |
|---|---|---|---|---|---|
| 1 | 1 | .680 | .127 | .121 | .446 |
| 2 | 1 | .948 | .248 | .022 | .440 |
| 3 | 1 | .821 | .189 | .139 | .423 |
| 4 | 2 | .396 | .680 | .237 | .239 |
| 5 | 2 | .441 | .851 | .184 | .239 |
| 6 | 2 | .394 | .201 | .338 | .564 |
| 7 | 2 | .775 | .401 | .006 | .617 |
| 8 | 2 | .241 | .359 | .412 | .773 |
| 9 | 3 | .113 | .097 | .449 | .450 |
| 10 | 3 | .896 | .327 | .122 | .927 |

Fig. 5

| Signal | Target ID | Range Bin 1 | Range Bin 2 | Range Bin 3 | Range Bin 4 |
|--------|-----------|-------------|-------------|-------------|-------------|
| 1 | 1 | 3 | 1 | 1 | 2 |
| 2 | 1 | 3 | 1 | 1 | 2 |
| 3 | 1 | 3 | 1 | 1 | 2 |
| 4 | 2 | 2 | 3 | 1 | 1 |
| 5 | 2 | 2 | 3 | 1 | 1 |
| 6 | 2 | 2 | 1 | 2 | 2 |
| 7 | 2 | 3 | 2 | 1 | 3 |
| 8 | 2 | 1 | 2 | 2 | 3 |
| 9 | 3 | 1 | 1 | 2 | 2 |
| 10 | 3 | 3 | 2 | 1 | 3 |

Label 1 <.25    .25>=Label 2 <=.45    Label 3 >.45

Fig. 6

| Signal | Target ID | Range Bin 1 | Range Bin 2 | Range Bin 3 | Range Bin 4 |
|---|---|---|---|---|---|
| 1 | 1 | 3 | 1 | 1 | 2 |
| 2 | 1 | 3 | 1 | 1 | 2 |
| 3 | 1 | 3 | 1 | 1 | 2 |
| 4 | 2 | 2 | 3 | 1 | 1 |
| 5 | 2 | 2 | 3 | 1 | 1 |
| 6 | 2 | 2 | 1 | 2 | 2 |
| 7 | 2 | 3 | 2 | 1 | 3 |
| 8 | 2 | 1 | 2 | 2 | 3 |
| 9 | 3 | 1 | 1 | 2 | 2 |
| 10 | 3 | 3 | 2 | 1 | 3 |

Fig. 7

| Signal | Target ID | Range Bin 1 | Range Bin 2 | Range Bin 3 | Range Bin 4 |
|---|---|---|---|---|---|
| 1 | 1 | 3 | 1 | 1 | 2 |
| 2 | 1 | 3 | 1 | 1 | 2 |
| 3 | 1 | 3 | 1 | 1 | 2 |
| 4 | 2 | 2 | 3 | 1 | 1 |
| 5 | 2 | 2 | 3 | 1 | 1 |
| 6 | 2 | 2 | 1 | 2 | 2 |
| 7 | 2 | 1 | 2 | 2 | 3 |
| 8 | 3 | 1 | 1 | 2 | 2 |

| Signal | Target ID | *Range Bin 1* | Range Bin 2 | Range Bin 3 | Range Bin 4 |
|---|---|---|---|---|---|
| 1 | 1 | 3 | 1 | 1 | 2 |
| 2 | 1 | 3 | 1 | 1 | 2 |
| 3 | 1 | 3 | 1 | 1 | 2 |
| 4 | 2 | 2 | 3 | 1 | 1 |
| 5 | 2 | 2 | 3 | 1 | 1 |
| 6 | 2 | 2 | 1 | 2 | 2 |
| 7 | 2 | 1 | 2 | 2 | 3 |
| 8 | 3 | 1 | 1 | 2 | 2 |

Fig. 9

| Signal | Target ID | Range Bin 1 | Range Bin 2 | Range Bin 3 | Range Bin 4 |
|---|---|---|---|---|---|
| 1 | 1 | 3 | *1* | 1 | 2 |
| 2 | 1 | 3 | *1* | 1 | 2 |
| 3 | 1 | 3 | *1* | 1 | 2 |
| 4 | 2 | 2 | *3* | 1 | 1 |
| 5 | 2 | 2 | *3* | 1 | 1 |
| 6 | 2 | 2 | *1* | 2 | 2 |
| 7 | 2 | 1 | *2* | 2 | 3 |
| 8 | 3 | 1 | *1* | 2 | 2 |

Fig. 10

SYSTEM AND METHOD FOR IDENTIFYING AN OBJECT

RELATED INVENTIONS

This is a divisional continuation of U.S. patent application Ser. No. 10/362,004, filed Feb. 19, 2003, now U.S. Pat. No. 7,035,754 for SYSTEM AND METHOD FOR IDENTIFYING AN OBJECT, which is a U.S. national stage (35 U.S.C. § 371(c)) application from PCT Pat. App. No. PCT/US01/22852 filed Jul. 20, 2001, for SYSTEM AND METHOD FOR IDENTIFYING AN OBJECT, which claims the benefit of U.S. provisional patent application Ser. No. 60/220,768 filed on Jul. 21, 2000 for OBJECT IDENTIFICATION SYSTEM, the entire disclosures of which are fully incorporated herein by reference.

FIELD OF THE INVENTION

The invention relates generally to a new organization of knowledge discovery in the information system described by a rough set theory. It provides a method and system for interpreting data and transforming it into useful information. The invention finds particular application to an information system and a method for solving or identifying pattern recognition problems, such as speech recognition, character recognition and fingerprint recognition. The system and method are also applicable to data mining and knowledge discovery in any data base where knowledge is described by a discrete set of features, such as radar signature data, data from non-destructive inspection techniques used in industrial quality control operations, medical test data, the stock market as represented by indices such as the Dow Jones Index and other financial parameters, among numerous other possible uses.

BACKGROUND OF THE INVENTION

Different techniques have been used in the past to extract useful information from a data set. In a data set or information system that can be represented as a table, with rows representing objects or signals associated with a specific class, and columns representing attributes of the objects, a number of methods have been used to identify or classify those objects in the past.

For example, High Range Resolution (HRR) radar imaging data, that can be used for an Automatic Target Recognition (ATR) system for military aircraft, can be represented as a table of data having rows representing signals with columns representing range bins (this example will be further discussed and described below). In the past, one of the most frequently chosen techniques to classify these HRR signatures (or identify the target aircraft represented by these HRR signals) has been to use a constrained quadratic classifier. This classifier is based on computing the mean and variance estimation for each range bin, or column entry, in the signal. A variant of this technique is to use the mean square error instead of the variance term.

This approach works best when there is a small class of targets to be identified, or classified—such as five or ten targets. In addition, this approach does very poorly at rejecting or not declaring on unknown targets. Further, it is not robust due to the fact that it tries to match range bins (column entries) in the signal which contain little or no information about the target. Typically, these range bins are at the beginning or at the end of the signal.

It has become apparent that there was room for significant improvement in the area of statistical pattern recognition. Applying emerging machine intelligence and data mining techniques to overcome the errors with estimations and assumptions in current statistical classifiers is highly desirable.

Rough set theory is an approach to data mining that has been around since the early 1980's. It was believed this theory had the potential to produce a more robust classifier. Rough Set Theory assumes that the training data set is all that is known and all that needs to be known to do the classification problem. Techniques to find the minimal set of attributes (columns, or range bins for the HRR problem example) to do the classification are available in the theory. Further, the theory should be robust since it will find all the classifiers.

A workable, robust classifier using machine learning and data mining techniques is needed. Specifically, the approach should determine which features, or attributes (columns) are important; generate a multiplicity of classifiers; be robust; and be computationally appropriate for real world problem solving.

Once the data is labeled, Rough Set Theory guarantees that all possible classifiers using that training data set will be found. There is no equivalent statement using statistical pattern recognition techniques that can be made. However, in the known Rough Set Theory method, generating all the classifiers is an NP-hard (non-polynomial time complexity) problem. In summary, all known methods are either subject to error, are computationally inefficient and therefore inappropriate for large problem sets, or both.

The present invention overcomes the above-described problems and others. It provides a computationally efficient, robust classification system and method that can be used on a wide variety of pattern recognition problems and for other types of data mining tasks.

SUMMARY OF THE INVENTION

According to one embodiment of the present invention, a system for identifying an object represented by a signal is provided. The system includes a computer system, training and testing information data sets, a labeler, a reduct classifier and a reduct classification fuser. The data sets are in tabular form with multiple rows and columns of data. Each row represents a signal—one or more known signals, or objects, in the training data set, and one or more signals, or objects, to be identified or classified in the testing data set. The system provides more accurate solutions for the object classification problem by use of the reduct classification fuser, as will become apparent from a reading of the detailed description and figures that follow.

According to another aspect of the invention, a partitioner and a column selector are provided which enable larger problems (which would be computationally intractable with current methods) to be solved quickly, even with standard, commercially-available, personal computers.

In accordance with a more limited aspect of the present invention, the system includes normalization logic to reduce the effects of scale between and within a signal. Furthermore, depending on the data being identified or classified, a wavelet transformer may be provided to wavelet transform each signal in a partition using a multi-level wavelet transform. The wavelet coefficients become additional signal attributes that are appended to the end of the signals thereby creating more columns of data for each row.

According to another embodiment of the present invention, a system for classifying a signal is provided. The system includes a computer system, a training and a testing data set and a reduct classification fuser. The reduct classification fuser combines otherwise marginal reducts to gain a better result for the signals classified. The data sets are presented in tabular form with each data set having a plurality of rows and columns of data. Each of the rows represents a signal.

As in the first embodiment, the system can also include a core calculator, a labeler, normalization logic, a partitioner and a wavelet transformer. The labeler can include fuzz factor logic (used on the test or actual data to be classified) that will be further described below.

A method of determining what classification a signal belongs to is also provided by the present invention. The method includes the steps of: providing a training information set; binary labeling the signals of the training information set; selecting a subset of the columns of the training information set that were binary labeled; calculating the reducts; determining the classification of the test signals using the reducts calculated for the training information set; and determining a final classification of each of the testing signals by combining, or fusing, the separate reduct classifications for each of the test signals. As will be explained in more detail below, this method of signal classification provides a better, more efficient and robust result than known Rough Set Theory methods or statistical methods.

In accordance with another aspect of the invention, a method step for partitioning the training information set into a plurality of partitions of columns is provided. This allows for more computationally efficient problem solving.

In accordance with a more limited aspect of the present invention, the method can include the step of binary labeling each of the test signals which may include the substep of using fuzz factor logic to screen columns from the classification where the labeling may be in doubt due to round-off error, noise, or other effects.

One advantage of the present invention is that the systems and method can automatically solve pattern recognition problems with high dimensional data sets by reducing computational cost.

Another advantage of the present invention is that the systems and method provide better accuracy of the classification solutions.

Yet another advantage of the present invention is that the systems and method are directly transferable to real time computing hardware structures, although a particular hardware organization is not a subject of this invention.

Still further advantages of the present invention will become apparent to those of ordinary skill in the art upon reading and understanding the following detailed description of the preferred embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 5 illustrates an example of sample HRR data in tabular form;

FIG. 6 illustrates the sample data of FIG. 5 after it has been labeled;

FIG. 7 illustrates ambiguous signals of the labeled data of FIG. 6;

FIG. 8 illustrates the equivalence classes of labeled signals of FIG. 6 after removing ambiguous signals;

FIG. 9 is illustrative of how the core is computed for the labeled data of FIG. 6;

FIG. 10 is also illustrative of how the core is computed for the labeled data of FIG. 6.

DETAILED DESCRIPTION OF ILLUSTRATED EMBODIMENT

Figure 1:
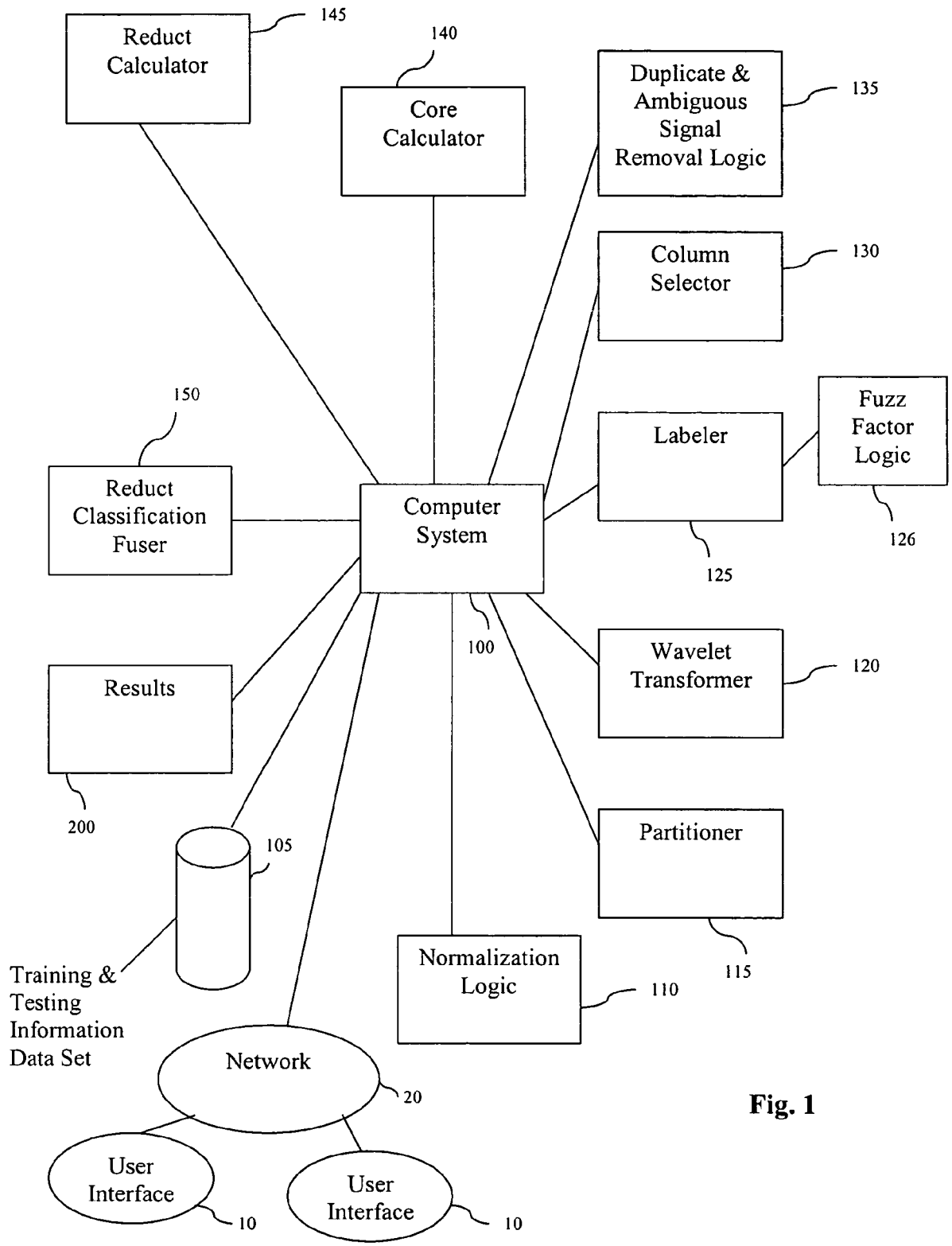
FIG. 1 is an exemplary overall system diagram of a system for identifying an object, or classifying a signal, in accordance with the present invention.

The following includes definitions of exemplary terms used throughout the disclosure. Both singular and plural forms of all terms fall within each meaning:

"Software", as used herein, includes but is not limited to one or more computer executable instructions, routines, algorithms, functions, modules or programs including separate applications or from dynamically linked libraries for performing functions as described herein. Software may also be implemented in various forms such as a servlet, applet, stand-alone, plug-in or other type of application.

"Logic", as used herein, includes but is not limited to hardware, software and/or combinations of both to perform one or more functions.

"Network", as used herein, includes but is not limited to the internet, intranets, Wide Area Networks (WANs), Local Area Networks (LANs), and transducer links such as those using Modulator-Demodulators (modems). "Internet", as used herein, includes a wide area data communications network, typically accessible by any user having appropriate software. "Intranet", as used herein, includes a data communications network similar to an Internet but typically having access restricted to a specific group of individuals, organizations, or computers.

"Object", as used herein, includes any item to be determined in a pattern recognition task. It is synonymous with a "signal" to be classified, or identified. The object may be a target, from radar imaging data, or any other item that can be represented as a one-dimensional signal for a recognition task to be solved. Fingerprint recognition, voiceprints, sonar data, etc., are all possible uses for the inventive method and systems described and claimed herein. Any object that can be readily represented as a one-dimensional signal, or be mathematically approximated by one or more one-dimensional signals, is a candidate problem that can be solved with the systems and method described and claimed herein based on rough set theory.

The invention presents a new organization of knowledge discovery in the information system described by a rough set theory and therefore is applicable to a number of pattern recognition problems like speech recognition, character recognition, and fingerprint recognition. It is also applicable to data mining and knowledge discovery in data bases where knowledge is described by a discrete set of features.

The determination of classifiers using rough set theory is a difficult problem whose computational expense increases exponentially with the number of attributes. The invention describes a partitioning method which improves computational efficiency for rough set analysis. As a result of partitioning, a set of classifiers is created. A method of fusing the individual classifiers is developed. The fused classifier outperforms any of the individual classifiers.

Thus, the invention has two distinctive features—(1) it provides means to solve pattern recognition problems with high dimensional data sets by reducing computational cost; and (2) it provides better accuracy of the solution. The method is directly transferable to a real time computing hardware structure, although a particular hardware organization is not a subject of this invention.

The inventive method and systems was driven by a need to create an efficient hardware realization for a target recognition system, as will be further described below, but again we stress that is but one example of the use of the inventive systems and method described herein. In summary, existing statistical methods suffer from a lot of problems when used for high dimensional data sets. This invention uses a local group of features for the object recognition task, that otherwise may be easily overlooked when statistical characterization of the recognition task takes place in the entire set of features. The invention described further below uses the idea of marginal classifiers and fusing them to achieve a more accurate result. In an example of the inventive systems and method that will be further described herein, the MATLAB® program was used for rough set generation and a High Range Resolution radar data set for a target recognition problem was solved.

This invention performs a function known as data mining. Data mining uses a set of information (training data set, or training information set) that is assumed to be all that is known. The information is organized as a table or array. Each column of the tale is an attribute (something known about the item to be classified) and the rows represent all the attributes that are associated with a given object or class and are called signals. Each signal in the training set must have a correct classification associated with it. This invention will determine the sub-set of attributes that are capable of determining which class a signal belongs to. In other words, the information has been reduced without giving up the classification ability. This process is automatic and requires no human intervention or intuition. This invention is applicable to any sort of classification problem (especially to any 1-D type of signal such as high range resolution radar) where the problem can be represented as a table of attributes.

The invention can be implemented on a general-purpose computer system, such as 100 in FIG. 1, and could be written in the language of the MATLAB® programming tool, as an example. This system has limitations imposed by constraints of time, memory and problem size. Problems consisting of multiple partitions using approximately 50 attributes and 5000 exemplars each are solved in a reasonable length of time. This requires a processor (Pentium II class) speed of at least 366 MHz and memory of at least 256 MB. Of course, it will be appreciated that faster computer systems 100 can solve larger problems and this size problem is just exemplary and is not in any way limiting on the systems and method described and claimed herein.

In the past, in order to determine the reduced sets of attributes in accordance with rough set theory, all combinations of attributes had to be tried. This process grew exponentially with the number of attributes according to the following formula:

$$\sum_{k=1}^{n} \frac{n!}{k!(n-k)!}$$

so for example, with n=29, the total number of possible reducts to be calculated is 536, 870, 911. For our HRR radar data for aircraft ATR example, we are interested in N=50 or more. For many real world size problems, the time required for these full calculations is prohibitive. Known rough set theory is not very applicable to high dimension data set problems. This invention, through labeling, partitioning, use of an innovative method of determining the reduced set, and fusing the partition results, has changed the time complexity to be quadratic instead of exponential. This permits real world problems to be solved.

Illustrated in FIG. 1 is an exemplary overall system diagram in accordance with the present invention that determines the identification of an object or the classification of a signal. A computer system 100 includes one or more computers that run software to process information. The computer or computers can be stand-alone, or the user interface 10 may be connected via a network 20. For example, there may be a user interface application (not shown) that is programmed to take the user through the object identification tasking and therefor could function as a pre-processor, a post-processor, or both, as is known in the computing arts.

A training information data set 105 and a testing information data set 105 are provided. The training and testing information data sets 105 are presented to the computer system 100 as an array, or table. The values in a row are associated with each other and are called a signal. The values in each column of a signal can come from any source as long as the values are related to the classification of that signal. These column values are attributes of the signals. FIG. 5 represents a small sample of ten signals representing three different targets for a High Range Resolution (HRR) radar classification problem, as an example of the types of problems that can be solved with the inventive method and systems described herein. Only four attributes, or columns of the data, are shown. These are referred to as range bins for the HRR data.

For training and testing purposes, the correct classification of the training information data set's 105 signals must be provided. When the system is in use, a test signal is provided from the testing information data set 105 and the computer system 100 provides the classification if possible.

The computer system 100 can use normalization logic 110 to normalize each signal in the training information data set 105, thereby reducing the effects of scale between and within a signal. The normalization process used is of course dependent on the particular application, as will be appreciated by one of skill in the art. For HRR radar signature data, where the signals values can be integers in the range of 0 to 255 a 2-Norm can be used. The 2-Norm is defined as:

$$N = \left(\sum_i |y_i|^2\right)^{\frac{1}{2}}$$

where $y_i$ are the attribute (column) values of a signal.

In order to handle large data sets and to obtain the best results, the training information data set or training data 105 can be partitioned. A partitioner 115 is provided for this function and there are at least two types of partitions that can be used, block and interleave.

Figure 2:
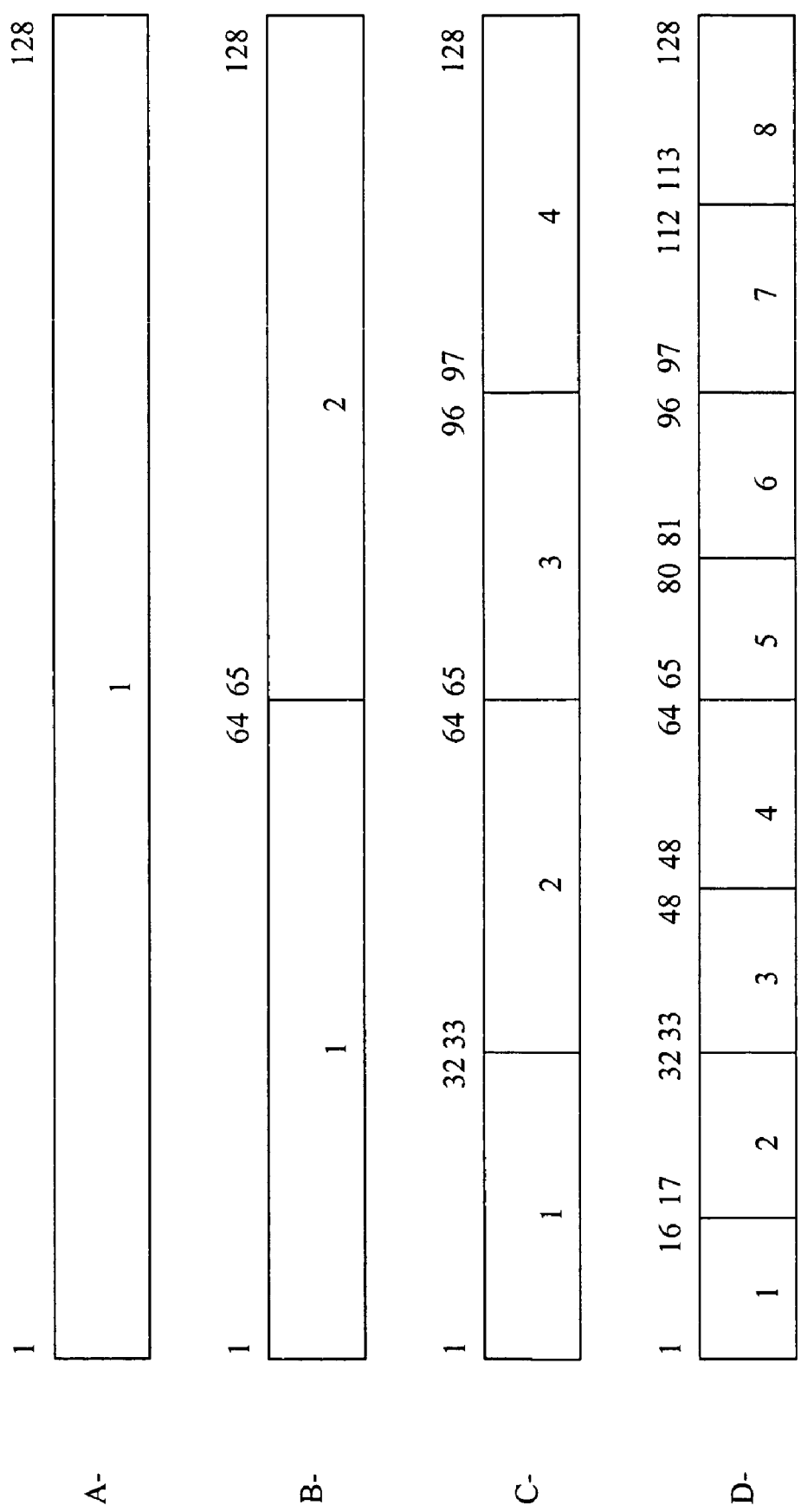
FIG. 2 is an exemplary diagram illustrating the block partitioning method of four exemplary partitioning schemes for partitioning columns of attributes of the training information data set in accordance with the present invention.

Referring now to FIG. 2, an example of block partitioning for an exemplary signal with 128 attributes (columns) would use the first 64 columns and the last 64 columns for two partitions. For four partitions there would be four partitions of 32 columns each, columns 1 to 32, columns 33 to 64, columns 65 to 96 and columns 97 to 128. For a larger number of partitions a similar procedure would be followed. The partitioner 115 performs this function for the computer system 100.

Figure 3:
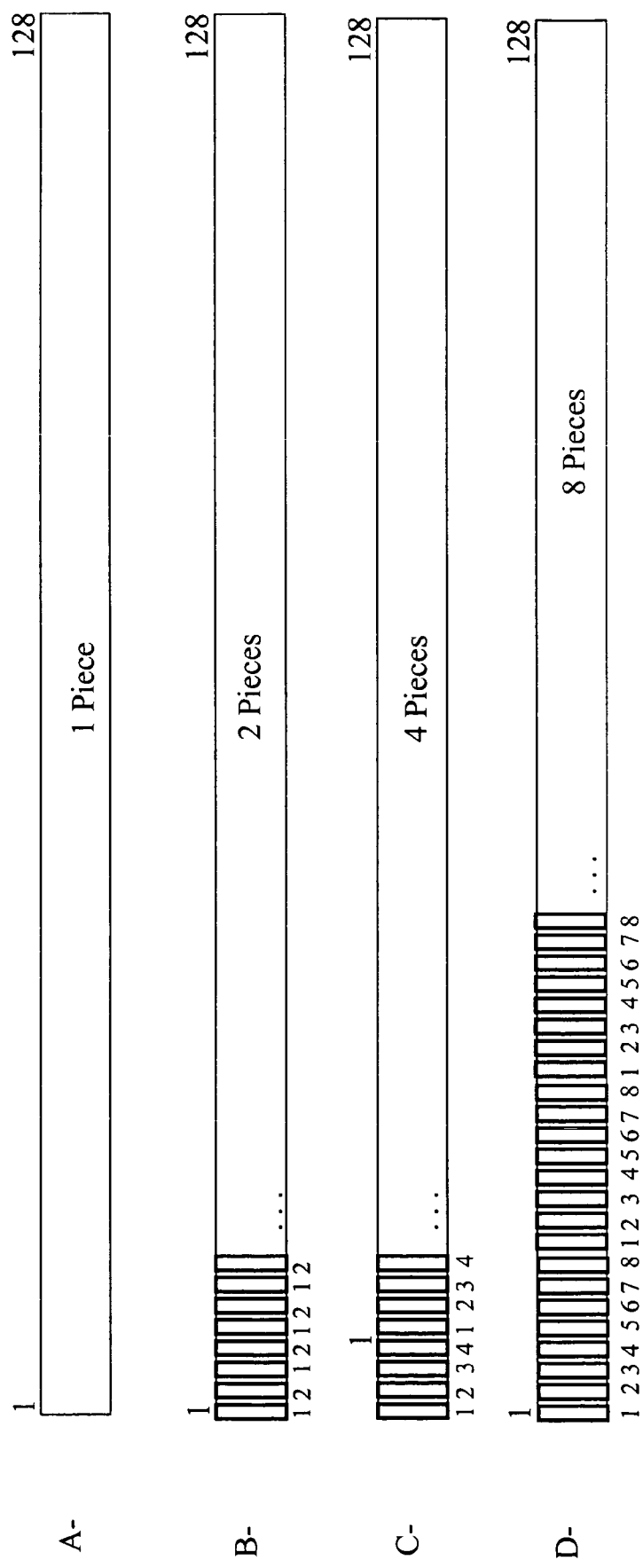
FIG. 3 is an exemplary diagram illustrating the interleave partitioning method of four exemplary partitioning schemes of partitioning columns of attributes of the training information data set in accordance with the present invention.

Referring now to FIG. 3, an example of interleaved partitioning is illustrated that is a bit more complex. For two divisions, one partition would consist of the even numbered columns and the second division the odd numbered columns. If there are four partitions, the first partition would consist of columns numbered 1, 5, 9, 13, etc. The second partition would consist of columns numbered 2, 6, 10, 14, etc. The third partition would consist of columns numbered 3, 7, 11, 15, etc. The fourth partition would consist of columns numbered 4, 8, 12, 16, etc., up to column 128. For a larger number of partitions, a similar procedure would be followed (FIG. 3).

A wavelet transformer 120 can be provided for use by the computer system 100. For each partition (see FIGS. 2 and 3), each signal in the partition can be wavelet transformed using a multi-level wavelet transform. Whether or not this step is performed is dependent on the data being classified. For signals where the various values are separated in time (frequency), wavelet transformation is valuable. The wavelet chosen has been determined to not be important so a Haar wavelet (the simplest) is used. The wavelet coefficients become additional signal values and are appended to the end of the signal creating more columns in each row. Wavelet transformation produces an approximation of the original signal (which contains half as many values as the signal itself) and a detail of the signal (which contains half as many values as the signal itself). The approximation is just that, an approximation of the original signal. The detail of the signal has the nuances of the signal. The approximation of the signal is coarse; the detail of the signal has the finer features. Multi-level wavelet transformation means that a wavelet transformation is performed on the values of the approximation of the signal and then on the values of the detail of the original signal. This process continues until there are insufficient values to do a wavelet transformation.

As an example of partitioned data being wavelet transformed via a computer system 100 using a wavelet transformer 120 with the appropriate logic for a Haar wavelet transform, HRR signals having 128 range bins, or columns, become signals with 1,024 pseudo range bins. A signal with 64 range bins (2 partitions) becomes a signal with 448 pseudo range bins. The signals with 32 range bins (4 partitions) become signals with 192 pseudo range bins. And finally, signals divided into eight partitions and thus having 16 range bins, become signals with 80 pseudo range bins.

For a rough set analysis, the signals, now supplemented by the wavelet coefficient, must be labeled. An analogy to fuzzy sets using a picture would be that fuzzy sets are concerned with how gray the pixels are whereas rough sets are concerned with how large the pixels are. Computer system 100 includes a labeler 125 for this purpose. Labeler 125 has a logic that uses a multi-class entropy method. Each column of the training set of signals is searched sequentially to establish the optimum point (threshold) which best separates signals of the various training classes. The quality of partition is measured by the entropy based information index defined as follows:

$$I = 1 - \frac{\Delta E}{E_{\max}}$$

where $$\Delta E = -\sum_{a=0}^{1}\sum_{c=1}^{n_c} p_{ac}\log(p_{ac}) + \sum_{a=0}^{1} p_a \log(p_a)$$

and $$E_{\max} = -\sum_{c=1}^{n_c} p_c \log(p_c)$$

a is the logic function of the signal column and is equal to 1 if the value exceeds the threshold and 0 otherwise, $n_c$ is the number of classes in the training set, $p_c$, $p_a$, $p_{ac}$ are probabilities of each class, attribute probability and joint probabilities respectively.

An example of labeling of the training signals is shown in FIGS. 5 and 6. FIG. 5 represents a sample of HRR Data for a training information data set (such as 105 in FIG. 1). Ten signals are shown and they correspond to three known targets. Labeling data with a labeler 125 makes data easier to handle and helps bring out patterns and trends. However, once data is labeled, some discrimination power is lost. In general, this is not critical and is even desirable. For example, cars are often labeled into categories such as subcompacts, compacts, mid-sized cars, etc. People are categorized in age ranges and given labels such as children, adolescents, young adults, middle-aged and seniors.

An example of the labeled HRR data of FIG. 5 is found in FIG. 6. Any value in the table of FIG. 5 less than 0.25 is labeled with a 1; any value between and including 0.25 and 0.45 is labeled with a Z; and any value greater than 0.45 is labeled with a 3.

A column selector 130 is used by the computer system 100 to select a subset of the best columns. For example, in our HRR example, we would typically desire the 50 best columns, meaning the columns that have the highest information index, to be selected. These are the columns that should do the best job of classifying the signals or identifying the targets. The number 50 was chosen as this is the largest practical size that can be computed on 400 MHz processor with 256 MB of memory. Faster computers with larger memories would permit a much larger number of columns to be considered for real time analysis.

Next, computer system 100 includes duplicate and ambiguous signal removal logic 135 to remove duplicate and ambiguous signals. This applies only to training information data set 105. Duplicate signals are defined as signals that are identical and are from the same classification. Ambiguous signals are signals which are identical and from different classifications. FIG. 7 shows that rows 7 and 10 from the FIG. 6 example data are ambiguous, since both have the same attributes, or column entries, but are associated with different target classes—namely target 2 for signal 7 and target 3 for signal 10. After labeling and selecting a subset of the signal columns it is likely that there will be duplicate and ambiguous signals. Ambiguous signals are confusing as the same signal is from two different classes. Therefore, both signals are removed. FIG. 8 shows equivalence classes made up from the signals seen in the labeled data of our FIG. 6 example. Duplicate signals in the equivalence classes can be removed to save computation time.

Computer system 100 next uses a core calculator 140 for calculating the core, as will be further described below. The set of training signals is sometimes referred to as an information system composed of attributes (columns) and a decision attribute (a column which contains the correct classification of the signal or row). After labeling, if it is possible to properly classify all signals using a sub-set of the attributes, that sub-set of attributes is called a reduct (a reduction in the size of the information system without losing any information; the ability to classify all the signals). It should be noted that there may be many reducts for a given information system. The attributes that are common to all reducts are known as the core. The core is determined by removing one column at a time. After the column is removed, the training set is examined to determine if there are any ambiguous signals. If there are, that means that that column (or attribute) is the only column of values that can distinguish the ambiguous signals. It must therefore be part of the core. For example, FIG. 9 shows that by removing Column 1, or range bin 1, signals 6 and 8 are ambiguous. Therefore, Column 1 is part of the core. Whereas in FIG. 10, removal of range bin 2 does not result in any ambiguous signals. Therefore, range bin 2 is not part of the core. This process continues until each column has been examined. The set of all columns, which when removed resulted in ambiguous signals, comprises the core.

Computer system 100 then uses a reduct calculator 145 calculating the reducts. Starting with the core, columns are added one at a time and the signal comprised of only those columns is examined to determine how many ambiguous signals there are. The set of all columns with the minimum number of ambiguous signals is set aside. If there is only one column with the minimum number of ambiguities that column is added to the core set of columns. The process repeats with the remaining columns. When the number of ambiguities becomes zero, that set of columns comprise a reduct. We now go back and replace the columns where there were several columns with the same number of minimum ambiguities and continue the process to determine the other reducts. Reduct determination is also done in known rough set theory.

Once all the reducts are calculated for the partitioned and reduced training information data set 105, computer system 100 can be used to test the performance of the full set of training signals in the training information data set 105. The full training set including duplicate and ambiguous signals is tested to determine performance of each reduct. Obviously there will be some misclassifications due to ambiguous signals. The reduced set of training signals (without duplicates and ambiguities), the reducts, and the performance of each reduct on the full training set is saved. This comprises the classification system. When classifying, a reduct specifies which columns of a signal are to be used for classification. These columns are selected from the training set 105. If a match is found then the signal is assigned the class of the training signal it matches. If no match is found the signal is marked as unclassified. In the training and test sets 105, where the correct answer is known, the performance of a reduct (a value called the probability of correct classification, Pcc) can be calculated from a confusion matrix. A confusion matrix C is constructed as follows. For each known signal, if the signal is known to be of class a and the reduct classifies it as class a then $C_{aa}$ is incremented by one. If the reduct classifies the signal as class b then $C_{ab}$ is incremented by one. Pcc is then computed as:

$$Pcc = \frac{\sum_{i=1}^{\#classes} C_{ii}}{\sum_{i=1}^{\#classes} \sum_{j=1}^{\#classes} C_{ij}}$$

The test signals may also be normalized, such as with normalization logic 110, and wavelet transformed, such as with a wavelet transformer 120, by computer system 100 as already described above for the training signals of the training information data set 105.

The labeling of the test signals 105 is slightly different than for the training set 105. The computer system 100 uses a labeler 125 as well as fuzz factor logic 126 to label the test signals of the test data set 105. Each column of the training set had a threshold value determined by information index. The training threshold is used for labeling the test set. However, if the signal value in the test set falls too close to the threshold value it is given a label associated with "don't care". This means that this value will not be used in the classification processing of that signal. This "don't care" region is established by the user with a 'fuzz factor'. If the minimum value of a column from the training set is called $y_{min}$, the maximum value called $y_{max}$, the threshold value called $y_t$, and the fuzz factor called f then the don't care distance δ is defined as:

$$\delta = f^* \min(|y_t - y_{min}|, |y_{max} - y_t|)$$

and the "don't care" region which will receive the special label is defined as:

$$y_t \pm \delta$$

The last step in the classification, or object identification, performed by computer system 100 is to use a novel Reduct Classification Fuser 150 having logic to fuse or combine what may be some otherwise marginal reducts. By this system and method, the combination of the marginal reducts, as well as some strong ones, results in an improved result for the final classification of each signal or object in the test data set 105. Each test signal is evaluated using every reduct to determine classification. All of these classifications are combined, based on the reduct's performance on the training set, to yield the final classification. The formula for combining the various results is:

$$W_t = 1 - \frac{Pcc_{max} + \left[\sum_{i=1}^{n}(1 - Pcc_i)\right](1 - Pcc_{max})}{\sum_{i=1}^{n} \frac{1}{1 - Pcc_i + \varepsilon}}$$

Using this, each signal is given $W_t$ scores associated with each possible class. The final classification is assigned to the class with the highest $W_t$ value if that value exceeds a threshold value set by the user.

Figure 4:
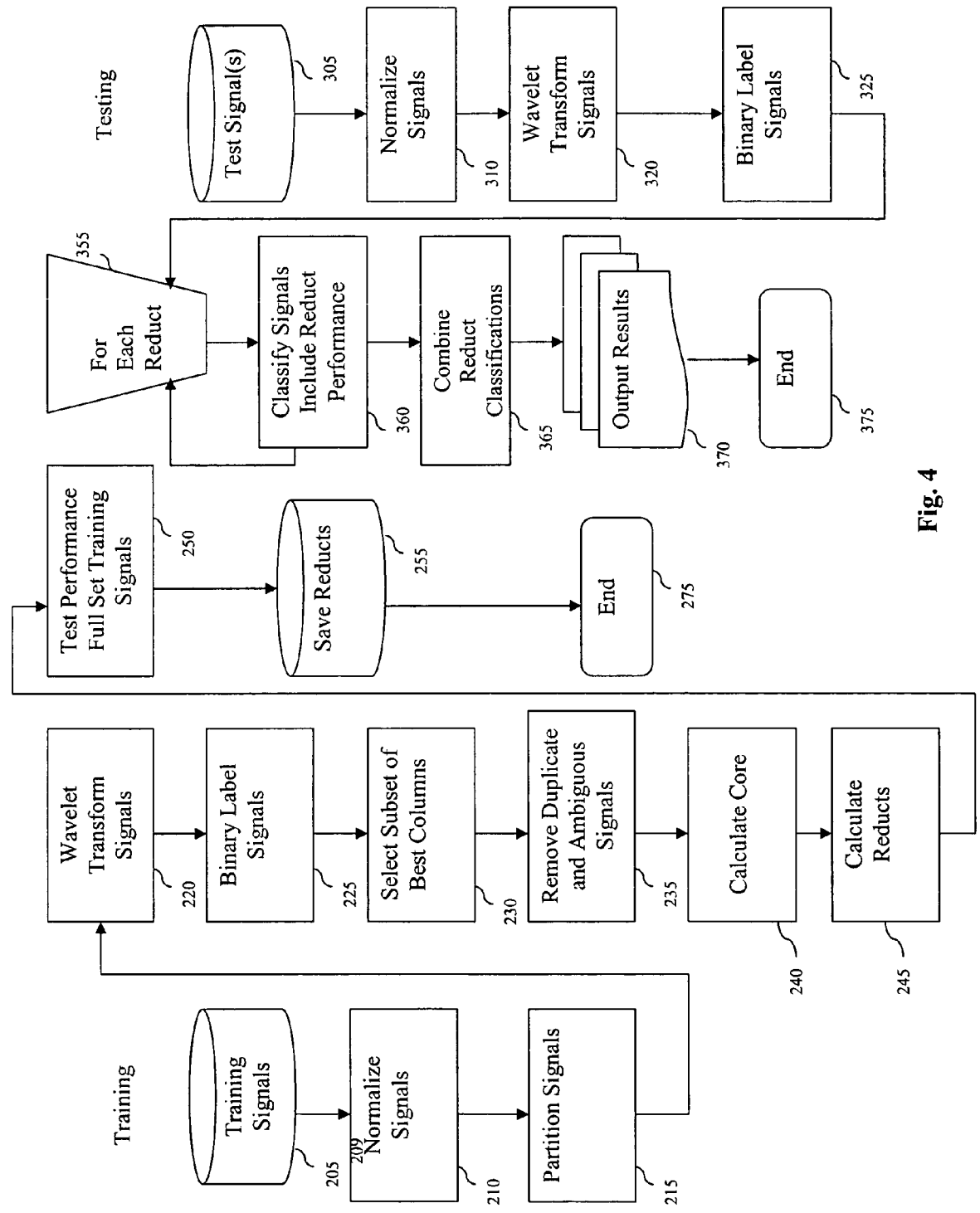
FIG. 4 is an exemplary overall process flow diagram of a method for determining the classification of a signal, in accordance with the present invention.

Illustrated in FIG. 4 is an exemplary methodology for determining what classification a signal belongs to. Of course, as mentioned above, this could be the identification of an object, which may be represented as a signal. The illustrated method in FIG. 4 could be implemented on a computer system such as 100 in FIG. 1, with a user interface (10 in FIG. 1), and the appropriate software and logic for encoding and performing the steps as will be described below. The blocks shown represent functions, actions or events performed therein. It will be appreciated that computer software applications involve dynamic and flexible processes such that the illustrated blocks can be performed in other sequences different than the one shown. It will also be appreciated by one of ordinary skill in the art that the software of the present invention may be implemented using various programming approaches such as procedural, object oriented or artificial intelligence technique.

The methodology of FIG. 4 will be described with additional reference to FIG. 1. The method is applicable to high dimensional data sets using rough set theory or data mining, that heretofore were computationally too large to handle by any known methods.

The method steps represented in FIG. 4 have been described above, in the description of the system shown in FIG. 1. So as not to be redundant, we will summarize the method steps below.

Training signals 205 are provided in the form of a table or an array, similar to the training information data set 105 in FIG. 1. The table can have a plurality of columns and rows. Attributes, or features, of the training signals 205, or classification, are column entries for the table. Each row represents a signal and comprises all the attributes of the classification.

The training signals may then be normalized as is shown in block 210 labeled "normalize signals." This method step may be done in accordance with the normalization logic 110 described above for the FIG. 1 system. Of course, as detailed above, different data signals may be normalized differently, as will be appreciated by one of ordinary skill in the art.

The method step for partitioning the signals of the training signals 205 into a plurality of partitions of columns may be performed in accordance with the process block 215, labeled "partition signals." Of course, the number and type of partitioning scheme, such as block or interleave, described above (and see FIGS. 2 and 3) is up to the user or method operator. Again, such inputs, if implemented on a computer system (see 100 in FIG. 1) may be performed by a preprocessor program (not shown) and via a series of queries to the user, as is known in the computing arts.

The method may also include the step of wavelet transforming each of the signals in each of the partitions. This is illustrated in the FIG. 4 process flow diagram at block 220, labeled "wavelet transform signals." Again, as described above, the wavelet chosen may be a Haar wavelet. The additional pseudo attributes of the wavelet transformed signals are appended to the ends of the signals as additional column entries.

The method step of binary labeling the signals is illustrated in block 225. Binary labeling may be accomplished with the multi-class entropy method as described above for labeler 125 (FIG. 1). The step of selecting a subset of the plurality of best-performing columns, as determined by those having the highest information index already discussed above for the column selector 130 in FIG. 1, is illustrated in FIG. 4 at block 230.

Next, the method includes the step of removing the duplicate and ambiguous signals from the training signals or training information set. This step is depicted in block 235 of FIG. 4 and was more thoroughly discussed above with reference to system component 135 in FIG. 1.

The step of calculating the core is represented at 240. This was thoroughly described above with reference to core calculator 140 in FIG. 1, as well as the description and FIGS. 9 and 10.

Calculating each of the reducts is illustrated at 245 in FIG. 4 and was described above for the system of FIG. 1 with reference to reduct calculator 145. Again this would be computationally burdensome if the training signals were not partitioned, wavelet transformed, labeled and downselected (selection of subset of best performing columns). Via this method, much larger, high dimensional data set problems can be classified, or identified, or solved.

Once the reducts are calculated on the training signals of the partitions, as described hereinabove, the full training set of signals 205 is tested to determine the performance of each reduct. Stated another way, method step 205 involves performing the classification of each signal in the training signals 205, or training information set, by using each of the reducts. This, too, was described further above. The reduced set of training signals, the reducts, and the performance of each reduct on the full set of training signals 205 can be saved, such as by block 250 in FIG. 4 labeled "save reducts." Block 275 indicates the end of this portion of the method dealing exclusively with data in the training signals 205 set.

Next, a set of test signals are provided as at step 305. They may similarly take the form of a table or array with a plurality of columns of attributes and rows of test signals. These test signals can be normalized and wavelet transformed, such as via method steps indicated in FIG. 4 at 310 and 320, respectively. This is further described above for the system of FIG. 1 and the use of normalization logic 110 and wavelet transformer 120 by the computer system 100 on both the training and testing information data sets (signals) 105.

The test signals 305 may be binary labeled, as at process block 325. The binary labeling of the test signals is slightly different than that for the training signals, and may use fuzz factor logic to identify a "don't care" region for some column values that lie close to the labeling point and thus may lead to erroneous labeling due to noise, round off error, or other factor. This was described more fully above with reference to FIG. 1 and the system references 100, 125 and 126.

Now, for each of the reducts, represented at 3MSS, the inventive method includes the step of determining a separate reduct classification for each of the test signals using each of the reducts 355. This is represented at process step 360 in FIG. 4 and was further described above with reference to FIG. 1 and computer system 100 and the reduct classification fuser 150. The individual reduct classifications for each of the test signals are then combined, as at 365, to produce a better classification, or identification, result than the individual reduct classifications. By the novel method of combining, or fusing, the otherwise marginal reducts as well as some of the better-performing individual reduct classifiers, the accuracy of the classification method and system is greatly increased. Another way to say this is that this fusing step is for determining a final classification of each test signal by combining each of the separate reduct classifications for each of the test signals. This was described more fully above for the computer system 100 and reduct classification fuser 150 of FIG. 1.

The final classification results can be outputted, as at 370, and the method finished as at end 375.

With the present invention, an object or signal from a set of test data full of unknown signals can be identified, or classified, based on information extracted from a known set of training data. Although not unlike Rough Set Theory, or data mining techniques, in this regard, the present inventive systems and method have a number of highly desirable features that permit real time use on high dimensional data sets. Accuracy of the solution is substantially strengthened—not sacrificed. The invention has wide ranging applicability to all types of classification problems—not just the HRR example for aircraft ATR systems. The inventive systems and method will automatically solve the recognition, classification or identification problems. The concept of multi-class entropy labeling to find the best labeling point in the data has been shown. The concept of using two data partitioning schemes (block and interleave) to reduce the computational time and improve classification accuracy was also described and illustrated. This also makes the methodology and system less sensitive to noise in the data and makes the system less sensitive to registration of the data. The method used to compute the minimal reducts in a reasonable time (quadratic instead of exponential time complexity) allows larger (real world) problems to be solved. The method used to fuse the results vastly increases the accuracy of the system. The method of fuzzifying the test data when values are close to the dividing point makes the system less sensitive to noise.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. The invention, in its broader aspects, is not limited to the specific details, the representative apparatus, and illustrative examples shown and described. Accordingly, departures may be made from such details without departing from the spirit or scope of the applicant's general inventive concept.

We claim:

1. A system for determining the classification of an unclassified signal comprising:
    a computer system having a processor;
    an input for receiving one or more unclassified signals having one or more attributes;
    a plurality of training signals associated with one or more known classifications, wherein each of the training signals has a plurality of training signal attributes;
    the computer system further comprising a first reduct calculator for calculating one or more reducts that include the minimum number of training signal attributes that are required to correctly classify the plurality training signals;
    the computer system further comprising a classifier for classifying a plurality of unclassified signals as a function of the one or more reducts and one or more attributes of the unclassified signals;
    the computer system further comprising a marginal reduct identifier for determining if one or more reducts provided one or more marginal classifications;
    the computer system further comprising a reduct classification fuser for combining one or more marginal reducts if identified by the marginal reduct identifier to determine a final classification; and
    an output for providing an output indicative of the final classification of one or more of the plurality of unclassified signals.

2. The system of claim 1 further comprising a labeler for labeling each of the test signals.

3. The system of claim 2 wherein the labeler comprises a binary labeler having a training threshold value determined for one or more attributes in the training signal and establishing a threshold value tolerance bond about each threshold value such that an attribute value falling within a respective threshold value tolerance band will not be considered in classifying that respective signal.

4. The system of claim 2 further comprising a normalizer for normalizing each of the test signals prior to binary labeling each of the test signals.

5. The system of claim 4 further comprising a wavelet transformer for wavelet transforming each of the test signals after they are normalized and before they are binary labeled.

6. The system of claim 1 further comprising a normalizer for normalizing the training signals.

7. The system of claim 1 further comprising a partitioner for partitioning the training signal into a plurality of attributes.

8. The system of claim 7 wherein the partitioner comprises a block partitioning for grouping one or more adjacent attributes.

9. The system of claim 7 wherein the partitioner comprises an interleave partitioning for grouping one or more non-adjacent attributes.

10. The system of claim 7 further comprising a wavelet transformer for wavelet transforming each of the training signals in each of the attributes.

11. The system of claim 1 further comprising a signal remover for removing duplicate and ambiguous signals from the plurality of training signals.

12. The system of claim 1 further comprising a core calculator for calculating a core, the core being included in each of the reducts.

13. The system of claim 1 further comprising a labeler.

14. The system of claim 13 wherein said labeler selects a label threshold using an entropy method.

15. The system of claim 14 wherein said labeler selects a label threshold using a multi-class entropy method.

16. The system of claim 1 comprising an algorithm to determine reducts, the algorithm having a time complexity that is quadratic.

17. A method of determining to what classification a signal belongs, the method comprising the steps of:
    providing a subset of training signals and a plurality of reducts, determining the classification to which a signal belongs by the steps of:
        providing a training information set in the form of a table of data, the table having a plurality of columns and rows, wherein each column of the table represents an attribute of the classification and wherein each row of the table is a training signal and represents attributes associated with a specific classification;
        partitioning the training signals;
        wavelet transforming signals in each of the training signal partitions and appending wavelet coefficients as additional signal values;
        labeling signals resulting from the wavelet transforming step;
        selecting a subset of the plurality of columns by removing duplicate and ambiguous signals;
        calculating the plurality of reducts;

providing a set of test signals in the form of a table with a plurality of columns of attributes and rows of test signals;

determining a classification of each test signal of the plurality of test signals using the classification system; and providing an output indicative of a classification of one or more test signals of the plurality of test signals.

18. The method of claim 17, further comprising providing a reduced set of labeled training signals, a plurality of reducts, and a performance value associated with each reduct; wherein said step of labeling the training signals comprises the step of binary labeling the training signals; and wherein said step of partitioning the training signals comprises the step of partitioning normalized training signals.

19. The method of claim 18 wherein said step of determining a classification of each test signal of the plurality of test signals comprises the steps of: determining a separate reduct classification of each of a plurality of test signals using reducts; and determining a final classification of each test signal of the plurality of test signals by combining each of the separate reduct classifications for one or more test signals.

20. The method of claim 17 further comprising the step of binary labeling each of the test signals.

21. The method of claim 20 wherein the step of binary labeling each of the test signals comprises the substeps of using a training threshold value determined for each column in the training set and establishing a threshold value tolerance bond about each threshold value such that a column value falling within a respective threshold value tolerance band will not be considered in classifying that respective signal.

22. The method of claim 17 further comprising the step of normalizing the training signals.

23. The method of claim 17 wherein the partitioning step is done via a block partitioning method whereby pluralities of adjacent columns are grouped into the partitions.

24. The method of claim 17 wherein the partitioning step is done via an interleave partitioning method whereby pluralities of non-adjacent columns are grouped into the partitions.

25. The method of claim 17 further comprising the step of calculating a core.

* * * * *